March 2, 1948.  Y. E. LEBEDEFF  2,436,868
RECOVERING TIN FROM STANNIC CHLORIDE
Filed Dec. 13, 1945
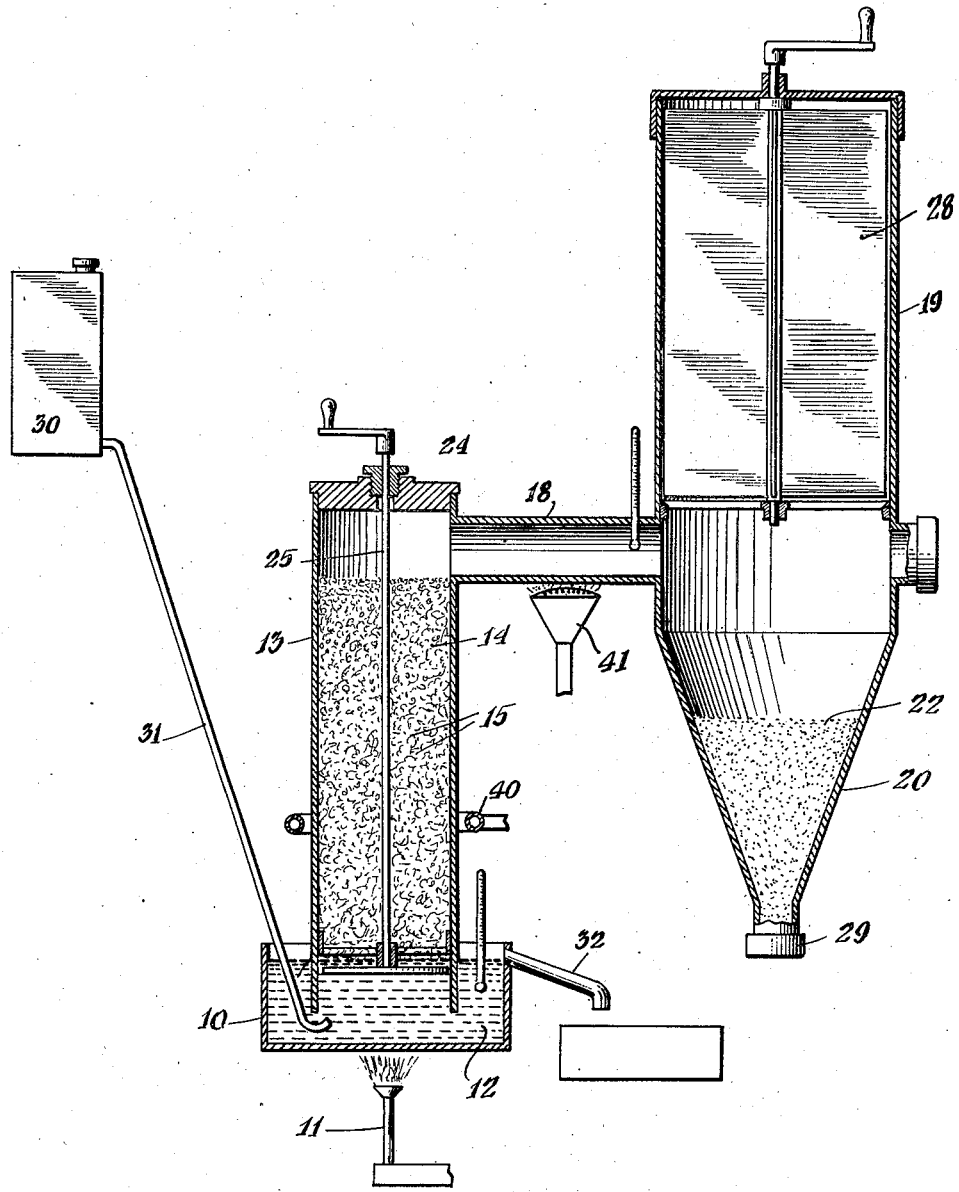
INVENTOR
Yurii E. Lebedeff
BY *James K. Kent*
ATTORNEY Patented Mar. 2, 1948

2,436,868

UNITED STATES PATENT OFFICE 2,436,868

RECOVERING TIN FROM STANNIC CHLORIDE

Yurii E. Lebedeff, Metuchen, N. J., assignor to American Smelting and Refining Company, New York, N. Y., a corporation of New Jersey Application December 13, 1945, Serial No. 634,747

5 Claims. (Cl. 75—85)

This invention relates to the recovery of tin from stannic chloride.

In accordance with the present invention, tin is produced from stannic chloride by reaction with aluminum. By conducting the process at such temperature as to sublime the aluminum chloride formed, the removal and separation of the desired tin from the aluminum chloride reaction product is readily effected.

Various advantages accrue from the use of the instant process including that of eliminating the use of fluxes, slag-forming tin displacement metals, and the like, which characterize certain of the well known prior art practices. Further, the process of the invention results in the production of relatively pure tin and of high grade aluminum chloride, both of which normally enjoy a ready market. Moreover scrap aluminum may be used as a source of aluminum for the process thereby lowering its cost.

The invention will be understood more readily from a consideration of the accompanying drawing which illustrates, in sectional elevation, an operative system suitable for carrying out the process of my invention.

In the drawing, a cast iron kettle 10 of desired capacity and which is heated by a burner 11, contains a bath of molten tin 12. Suitably supported over the kettle 10 is a hollow vessel or cylinder 13, providing a reaction chamber 14. The open lower end of the vessel 13 is immersed in the bath 12, as illustrated, and the remainder of the vessel is substantially filled with pieces of aluminum in solid state, as indicated at 15. Scrap aluminum in the form of grindings, borings, chippings, etc., which are low in iron, are preferably used for filling the reaction chamber 14, but high purity aluminum may be utilized if desired.

Near the top of vessel 13 is a pipe 18 connecting the upper part of the reaction chamber 14 with a condenser 19. Aluminum chloride sublimate formed during reaction of the gaseous stannic chloride and aluminum in the chamber 14 is conducted through this pipe 18 into the condenser 19 and condensed, aluminum chloride being collected in the bottom funnel-shaped receiver 20 of the condenser, as indicated at 22.

The reaction vessel 13 is closed by a cover 24 which is suitably arranged for removal from time to time to introduce aluminum into the chamber 14 as required to replace the aluminum consumed during the process. A stirrer 25 is arranged in the vessel 13 so that the molten tin can be agitated just below the surface of the bath and break up any encrustations which might form and tend to obstruct the passage of gaseous tin chloride. A hand operated agitator is illustrated on the drawings but it will be appreciated that a motor driven or otherwise mechanically operated mechanism may be substituted for the manual means.

Condenser 19, preferably of cylindrical shape, is arranged for cooling in the air at a sufficiently low temperature to condense the volatilized aluminum chloride passing into it from the reaction chamber 14. A scraper 28 is provided to remove any aluminum chloride which condenses on the side walls of the condenser. The granular-like condensate scraped off is deposited in the lower conical-shaped hopper 20 from which it is removed from time to time through the opening 29.

During operation, liquid anhydrous stannic chloride is fed from a storage container 30 by gravity into the molten tin bath through the conduit 31, being discharged below the surface of the molten bath of tin and beneath the lower end of the vessel 13 immersed in the metal bath. The rate of feed of liquid stannic chloride is suitably controlled and the temperature of the bath regulated to provide maximum efficiency of operation. Reaction of the SnCl₄ vapor, resulting from the introduction of the liquid stannic chloride into the bath 12, with the aluminum metal is effected in the reaction chamber 14 producing tin which adds to the molten tin bath. Excess tin overflows from the kettle 10, as indicated at 32, into molds for casting into marketable shapes. The aluminum chloride, formed during the reaction, passes up through the reaction chamber and into the condenser 19 by way of the interconnecting pipe 18 being maintained at a temperature at or above the sublimation point (375° F.) of aluminum chloride.

The following specific example will serve to illustrate the process. Nineteen pounds of tin metal were melted in kettle 10 to form the metal bath 12. Analysis of the tin used showed 97% Sn, 1.9% Sb, 1% Cu, 0.1% Pb with traces of other impurities. Aluminum scrap grindings amounting to 14 lbs. 9 oz. were placed in the reaction chamber 14, such scrap analyzing 93% Al, 4.1% Cu, with minor amounts of other metals.

With the temperature of the molten tin bath 12 being maintained between 750–850° F., anhydrous liquid stannic chloride, analyzing 45% Sn with less than 0.1% As and Sb, was continuously fed into the molten bath. The reaction chamber and pipe 18 connected to the condenser were maintained at a temperature of around 400° F.

The process was carried out for 36 hours and 126 pounds and 8 ounces of SnCl4 were treated for recovery of tin and, as a by-product, aluminum chloride. Dross which formed on the surface of the metal bath 12 outside the reaction chamber was intermittently skimmed off and amounted to 11 pounds and 14 ounces of which 4 pounds and 15 ounces was metal and 6 pounds and 15 ounces was oxide. Overflow metal from kettle 10 amounted to 48 lbs. 9 oz. and analyzed 99.0% Sn, 0.5% Sb, 0.2% Al with traces of Mg and Mn.

As a by-product 67 lbs. 14 oz. of aluminum chloride was produced analyzing 19.7% Al, 0.1% Sn, 0.2% Fe with traces of other impurities. The residue in the reaction chamber amounted to 15 lbs. and comprised 32.8% Sn, 42.2% Al and 18.9% Cl. The residual metal bath, amounting to 13 lbs., analyzed 99.0% Sn, 0.2% Al, 0.2% with minor impurities. Tin recovery was calculated as 99.3% and aluminum recovery 89.4%.

The small amount of tin unaccounted for may be attributed to channeling through the aluminum scrap reaction column permitting unrestricted passage of SnCl4 vapor therethrough and to the adherence of small amounts of metallic tin to the apparatus after cleaning out at the end of the run. The aluminum loss was principally due to escape of AlCl3 vapor when the reaction chamber was opened intermittently for charging same with aluminum, and to the loss resulting from volatilization of AlCl3 while removing same from the condenser.

Although the reaction between tin tetrachloride and aluminum is exothermic, the large amount of radiation surface present in the apparatus illustrated made it necessary to externally heat the reaction chamber and the interconnecting pipe to the condenser in order to maintain proper temperature conditions. Heating means for this purpose are illustrated in the drawing by burners 40 and 41, respectively. Insulation and jacketing could, of course, be employed to eliminate the need for applying external heat to these parts of the apparatus, as will be apparent to those skilled in the art.

Agitation in the reaction chamber may be omitted under certain conditions but is preferably employed during extended operation to preclude crust formation or the like, tending to hinder the steady flow and proper distribution of gaseous tin chloride into the reaction chamber. In addition, stirring agitates the aluminum metal scrap thereby minimizing "channeling" with possible passage therethrough of gaseous tin chloride.

It will be appreciated that should it be desired to recover the tin from stannic chloride in the form of an alloy the molten metal bath will be composed of the desired alloying metal. For example, where the tin is to be made into a solder, a lead bath may be used to alloy with the tin released by the reduction of tin chloride in accordance with the process of the invention. Further, it will be understood that the metal used in the bath may be of any desired grade or purity depending upon the conditions and uses to which the recovered tin or tin-alloy is to be put.

What is claimed is:

1. The process for recovering tin from stannic chloride which comprises establishing a molten bath of tin, introducing anhydrous liquid stannic chloride into contact with the molten bath of tin to produce gaseous tin chloride, reacting said gaseous tin chloride with pieces of aluminum in solid state to effect reduction of the tin chloride to tin metal with the formation of aluminum chloride, and collecting the tin resulting from the reduction reaction in said molten bath of tin.

2. The process for recovering tin from stannic chloride which comprises establishing a molten bath of tin, introducing anhydrous liquid stannic chloride into said molten tin bath to convert the liquid tin chloride to gaseous tin chloride, confining said gaseous tin chloride above said molten tin bath while bringing it into reactive contact with pieces of aluminum in solid state to displace the tin from the stannic chloride forming aluminum chloride, and collecting the displaced tin in the said molten tin bath.

3. The process for recovering tin from stannic chloride which comprises establishing a molten bath of tin, introducing anhydrous liquid stannic chloride into said molten tin bath thereby converting the liquid tin chloride to gaseous tin chloride which evolves from the bath, reacting said gaseous tin chloride with pieces of aluminum in solid state to displace the tin from the stannic chloride forming aluminum chloride sublimate, returning the tin resulting from the reaction to the molten bath of tin from which it previously evolved as gaseous tin chloride, and separately recovering the aluminum chloride.

4. In a process for recovering tin from stannic chloride by displacement of the tin from the stannic chloride, the step of reacting gaseous stannic chloride with pieces of aluminum in solid state at a temperature sufficient to effect sublimation of the resulting aluminum chloride and thereby effect its separation from the tin produced.

5. The process of recovering tin in alloy form from stannic chloride which comprises: establishing a molten bath of alloying metal, introducing anhydrous liquid stannic chloride into said bath thereby converting the liquid tin chloride to gaseous tin chloride, confining said gaseous tin chloride above said bath while bringing it into reactive contact with pieces of aluminum in solid state thereby displacing the tin from the stannic chloride and forming aluminum chloride, removing the aluminum chloride from the zone of reaction as aluminum chloride sublimate, and collecting the displaced tin in said molten bath to form the desired tin alloy.

YURII E. LEBEDEFF.

REFERENCES CITED

The following references are of record in the file of this patent:

UNITED STATES PATENTS

| Number | Name | Date |
| --- | --- | --- |
| 1,645,143 | Humphrey et al. | Oct. 11, 1927 |
| 2,086,894 | Betterton et al. | July 13, 1937 |